May 18, 1965 S. W. BOREEN ETAL 3,183,735

REVERSIBLE POWER AND MANUAL DRIVE

Filed Nov. 1, 1962

INVENTORS
STUART W. BOREEN
JAMES W. HEALY
BY
Fryer & Tjensvold
ATTORNEYS 3,183,735

REVERSIBLE POWER AND MANUAL DRIVE

Stuart W. Boreen, Belmont, Calif., and James W. Healy, Wakefield, Mass., assignors to Dasa Corporation, a corporation of California Filed Nov. 1, 1962, Ser. No. 234,610
3 Claims. (Cl. 74—472)

Figure 1:
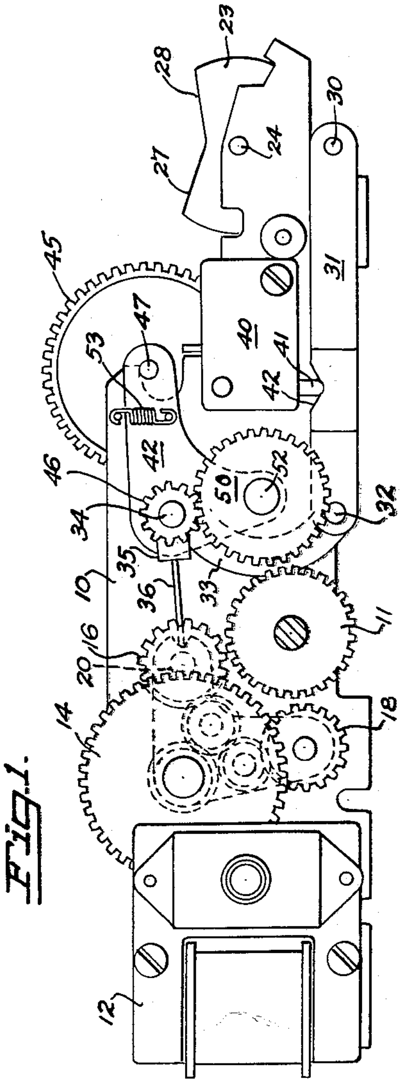

This invention relates to a combination power and manual drive such as may be used for the moving of tapes or webs of paper-like material which bear listed information and are carried on rotatable spools to enable any item listed throughout the length of the tape to be brought into a reference position.

A drive mechanism similar to that of the present application is disclosed in the co-pending application of James Kilburg for "Support and Drive Means for Adjustable Tapes," filed August 4, 1960, Serial No. 47,524, now U.S. Patent No. 3,081,047, issued March 12, 1963. A removable tape magazine with an advanceable tape therein with which the present invention is designed for use is disclosed in the co-pending application of James W. Healy for "Locating and Securing Means for Removable Plates," filed October 29, 1962, Serial No. 233,601. The devices disclosed in both of said co-pending applications are designed for use in an automatic telephone dialing machine and only so much of such a machine as is necessary to an understanding of the present invention will be disclosed herein. The usefulness of the invention for purposes other than the type or machine referred to herein will be apparent from an understanding of the following disclosure.

In the automatic telephone dialing machine to which the present invention has been particularly adapted, an advanceable tape of paper-like form bears coded information in lines or spaces which are arranged transversely of its length. By adjusting the tape lengthwise, any single line of such coded information, which may be magnetized areas representing a telephone number, may be brought into juxtaposition with a decoding mechanism. Each code line represents the telephone number of a subscriber to be called and the tape also bears the names of the subscribers usually alphabetically arranged to enable the tape readily to be positioned for making any desired call.

When a coded line is properly positioned with respect to the number to be called and the name of the party to be called exposed to view, the operation of the machine is initiated by depression of a button or key and a set of electric impulses comparable to those created in the operation of a conventional telephone dial is created and transmitted to a telephone circuit. Presently available telephone dialing machines includes tapes of great length to accommodate several hundred telephone numbers and names so that adjustment in the tape for long distances can be tedious if done by hand. The present invention relates to a device for adjusting the tape in either of two directions by power drive mechanism, such as an electric motor where the tape is to be moved a great distance, and includes manual adjusting means for the final adjustment usually required to bring a particular subscriber's name and coded number into proper position.

It is an object of the present invention to provide an improved and extremely simple power transmitting mechanism operable either by motor or manually.

A further object of the invention is to provide a reversible motor actuated power transmission with means to insure instant and perfect meshing of forward and reverse drive gears.

Further and more specific objects and advantages of the invention are made apparent in the following specification wherein reference is made to the accompanying drawing.

Figure 2:
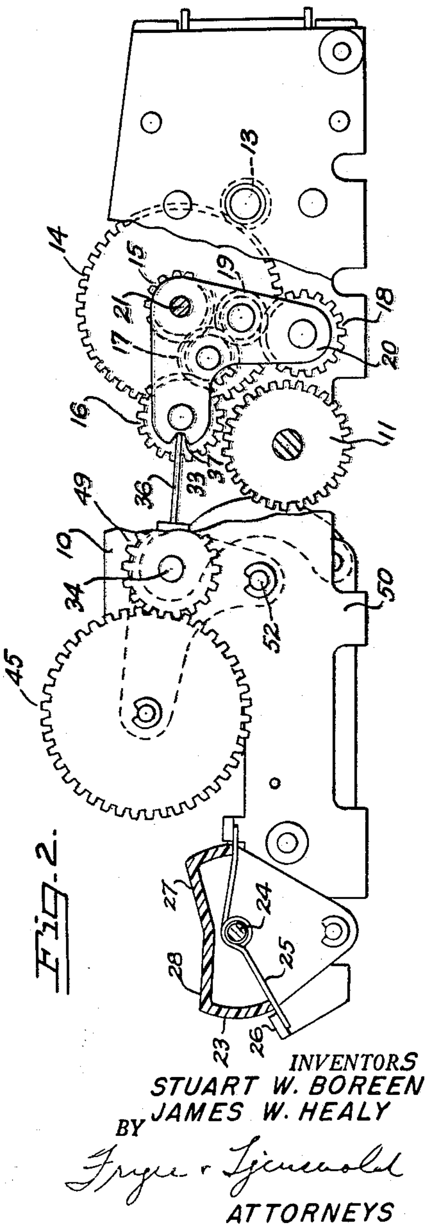

In the drawing:

FIG. 1 is a view in elevation of one side plate of an automatic telephone dialing machine showing the tape drive mechanism of the present invention mounted thereon; and FIG. 2 is a view of the opposite side of the same plate with parts broken away and parts shown in section.

The supporting plate for the drive means to be described is shown at 10 in the drawing and in FIG. 2 is partially broken away to disclose a gear train. A gear to be driven is shown at 11 and is formed as a part of a tape magazine of the kind disclosed in the aforesaid copending application, Serial No. 233,601. Means are also disclosed in said application for precisely orienting the magazine and gear with respect to the rest of the machine which includes a side plate 10 such as shown herein. The gear 11 is driven selectively in opposite directions to advance the tape in opposite directions by an electric motor 12. A pinion gear 13 on the motor (see FIG. 2) meshes with and drives a large gear 14 which carries for rotation therewith a small gear 15. The gear 15 drives a forward gear 16 through an idler gear 17, and a reverse gear 18 through the same idler 17 and a reversing idler 19. All of the gears 16, 17, 18 and 19 are mounted for rotation on a common rocker plate 20 supported for oscillation on a shaft 21 coaxial with the gear 15. Consequently with the motor 12 energized, the forward and reverse gears 16 and 18 are rotating constantly and movement of the rocker plate 20 about its axis before energization of the motor will bring either one or the other into mesh with the gear 11 to be driven.

The motor is energized and the direction of drive is selected by a finger actuated lever 23 mounted for rocking movement about its pivot 24 and normally held in a central position as by a spring 25 encircling the pivot and having ends engaging beneath opposite sides of the lever and also beneath stop lugs 26 formed on the frame 10. The top of the lever 23 is shaped to provide two angularly related surfaces 27 and 28 to facilitate rocking the lever in either direction by downward pressure exerted at opposite sides of the pivot 24. The lower end of the lever 23 is pivotally connected as at 30 (FIG. 1) to one end of a bar 31, the opposite end of which is pivoted as at 32 to the lower end of a lever 33 pivotally supported at its upper end for rocking movement about the center of a shaft 34. This lever has a short arm 35 which carries a resilient pin or spring wire 36 engaging a notch 37 in one arm of the rocker plate 20.

With the construction just described, it is apparent that depression of one of the surfaces 27 or 28 to rock the lever 23 will effect meshing of the forward or reverse drive gears 16 and 18 selectively with the gear 11 to be driven. It is then necessary to energize the motor 12 for imparting a drive to the gear 11. The motor is energized by a micro-switch 40 in a conventional circuit (not shown) which includes the motor and a power source. A closing pin 41 of the micro-switch depends into a V-shaped notch 42 in the bar 31 so that actuation of the bar in either direction for engaging the forward or reverse gears also raises the pin 41 to close the switch. The micro-switch is closed only upon full movement of the bar 31 in either direction and after one of the drive gears is in mesh with the gear 11 to be driven, thus preventing gear clash when the direction of drive is selected. It is possible, however, that a tooth crest of either of the gears 16 or 18 may come into direct contact with a tooth crest on the gear 11 and pressure between the gear teeth in this position, which can be exerted by a finger on the lever 23, can be sufficient to prevent starting of the motor. It is for this reason that the member 36 which rocks the rocker plate 20 is a spring having sufficient rigidity to move the rocker plate but being sufficiently resilient to limit the pressure against abutting gear teeth to a value that will permit the motor to start when it is energized. Consequently in instances where the gear teeth crests meet each other, the initial turning movement of the motor drives the gear 16 or 18 sufficiently to insure proper meshing engagement with the gear 11. The motor and drive mechanisms so far described are for moving a tape through relatively long distances. A manual drive is more effective for moving the tape only through one or two spaces to bring a selected name into view. A large gear 45 is arranged to have its upper portion project through a suitable opening in the machine housing to provide what is in effect a knurled finger wheel to be manually rotated.

The gear 45 rotates about a shaft 47 on a bell-crank lever 42. This lever is pivoted about the center of the shaft 34 upon which a gear 49 is fixed for meshing engagement with the gear 45. A gear 46 is fixed on the opposite end of the shaft 34, as shown in FIG. 1, to mesh with and drive a drive gear 50 rotatably supported on a pin 52 on the opposite arm of the bellcrank lever 42. The lever 42 is normally swung upwardly by a spring 53 to prevent engagement between the drive gear 50 and the gear 11 to be driven during operation of the power drive mechanism, previously described, and may be swung downwardly by finger pressure on the wheel 45. Downward swinging movement brings the gear 50 into engagement with the gear 11 to be driven and rotation of the wheel in one direction or the other effects rotation of the gear 11 in the selected direction and consequent adjustment of the tape controlled thereby.

We claim:

1. In a recording device having a magazine for a tape-like recording medium, apparatus for positioning such medium, comprising:
   (*a*) a driving gear mounted on the magazine and adapted to be driven in either a forward or a reverse direction as required to position the tape-like recording medium;
   (*b*) a forward and a reverse gear train, each normally out of contact with the driving gear;

(*c*) means for selectively urging either the forward or the reverse gear train into mesh with the driving gear, such means including a mechanical linkage having a resilient member to limit the maximum pressure between the driving gear and the selected gear train urged into mesh therewith; and,
   (*d*) means, responsive to operation of the mechanical linkage, for then simultaneously actuating the forward and the reverse gear train.

2. Apparatus as in claim 1 wherein:
   (*a*) the forward and reverse gear trains are mounted on opposite sides of a rocker plate; and
   (*b*) the mechanical linkage includes:
      (1) a manually operated selector lever pivotally mounted on the recording device, such lever being normally biased to a neutral position;
      (2) a link pivotably connected to the manually operated selector lever to convert rotation thereof to linear motion substantially tangential to one end of the rocker plate;
      (3) and said resilient member being disposed between the link and the one end of the rocker plate to convert the linear motion of the former into rotational motion of the latter to engage, with a selected maximum pressure, the selected one of the forward and reverse gear trains with the driving gear.

3. Apparatus as in claim 2 having, in addition:
   (*a*) an electric motor adapted to drive the forward and the reverse gear trains; and,
   (*b*) switch means operative in response to completion of motion of the link in either direction to energize the electric motor.

References Cited by the Examiner

UNITED STATES PATENTS

| | | | |
|---|---|---|---|
| 1,563,546 | 12/25 | Bouillon. | |
| 2,911,849 | 11/59 | Mitchell et al. | |
| 3,078,475 | 2/63 | Turner | 74—625 |

DON A. WAITE, *Primary Examiner.*